(12) United States Patent
Nagase

(10) Patent No.: US 11,704,074 B2
(45) Date of Patent: Jul. 18, 2023

(54) PRINTING APPARATUS AND CONTROL METHOD FOR PRINTING SELECTED STATUS INFORMATION

(71) Applicant: SEIKO EPSON CORPORATION, Tokyo (JP)

(72) Inventor: Daigo Nagase, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/647,763

(22) Filed: Jan. 12, 2022

(65) Prior Publication Data

US 2022/0229608 A1 Jul. 21, 2022

(30) Foreign Application Priority Data

Jan. 15, 2021 (JP) ................. 2021-005099

(51) Int. Cl.
  *G06F 3/12* (2006.01)
(52) U.S. Cl.
  CPC .......... *G06F 3/1203* (2013.01); *G06F 3/1219* (2013.01); *G06F 3/1243* (2013.01)
(58) Field of Classification Search
  CPC ................................................. G06F 3/1203
  USPC ....................................................... 358/1.15
  See application file for complete search history.

(56) References Cited

U.S. PATENT DOCUMENTS

| 2006/0024115 | A1* | 2/2006 | Komatsu | B41J 11/009 400/613 |
| 2012/0274953 | A1* | 11/2012 | Makabe | B41J 11/42 358/1.13 |
| 2022/0137902 | A1* | 5/2022 | Ogawa | G06F 3/1203 358/1.15 |

FOREIGN PATENT DOCUMENTS

JP  2013-022879 A  2/2013

* cited by examiner

*Primary Examiner* — Jacky X Zheng
(74) *Attorney, Agent, or Firm* — Workman Nydegger

(57) ABSTRACT

A printing apparatus comprises: a print portion configured to perform printing on a print medium drawn from a rolled medium; and a print controller configured to cause the print portion to print status information in response to an instruction to print the status information. The print controller is configured to cause the print portion to print first status information, which is part of the status information, cause the print portion to print at least one of selection items corresponding to pieces of status information, and cause, when at least one printed selection item is selected, the print portion to print second status information corresponding to the selected selection item.

9 Claims, 5 Drawing Sheets

PRINTING APPARATUS AND CONTROL METHOD FOR PRINTING SELECTED STATUS INFORMATION

The present application is based on, and claims priority from JP Application Serial Number 2021-005099, filed Jan. 15, 2021, the disclosure of which is hereby incorporated by reference herein in its entirety.

BACKGROUND

1. Technical Field

The present disclosure relates to a printing apparatus and a control method.

2. Related Art

In a technology involved in a printing apparatus, information about the status of the printing apparatus is printed. In print processing in a printing apparatus disclosed in JP-A-2013-22879, data received from an information processing apparatus is used when communication with the information processing apparatus is decided to be possible, and data created by a creation means that creates data used to print the status of the printing apparatus or its settings is used when communication with the information processing apparatus is decided not to be possible.

When there are many types of printable status information, the printing apparatus disclosed in JP-A-2013-22879 is problematic in that although the user wants to view only part of status information, when all types of status information is printed, the user has to wait during the printing of undesired information. Another problem is that print media used to print the undesired information are wasted.

SUMMARY

A printing apparatus comprises: a print portion configured to perform printing on a print medium drawn from a rolled medium; and a print controller configured to cause the print portion to print status information in response to an instruction to print the status information. The print controller is configured to cause the print portion to print first status information, which is part of the status information, cause the print portion to print at least one of selection items corresponding to pieces of status information, and cause, when at least one printed selection item is selected, the print portion to print second status information corresponding to the selected selection item.

A control method for a printing apparatus is configured to include a print portion configured to perform printing on a print medium drawn from a rolled medium and printing status information in response to an instruction to print the status information, the method comprising: printing first status information, which is part of the status information; printing at least one of selection items corresponding to pieces of status information; and printing, when at least one printed selection item is selected, second status information corresponding to the selected selection item.

DESCRIPTION OF EXEMPLARY EMBODIMENTS

Embodiments of the present disclosure will be described in the following order.
1. Structure of a printing apparatus
2. Status information print processing
3. Other embodiments

1. Structure of a Printing Apparatus

Figure 1:
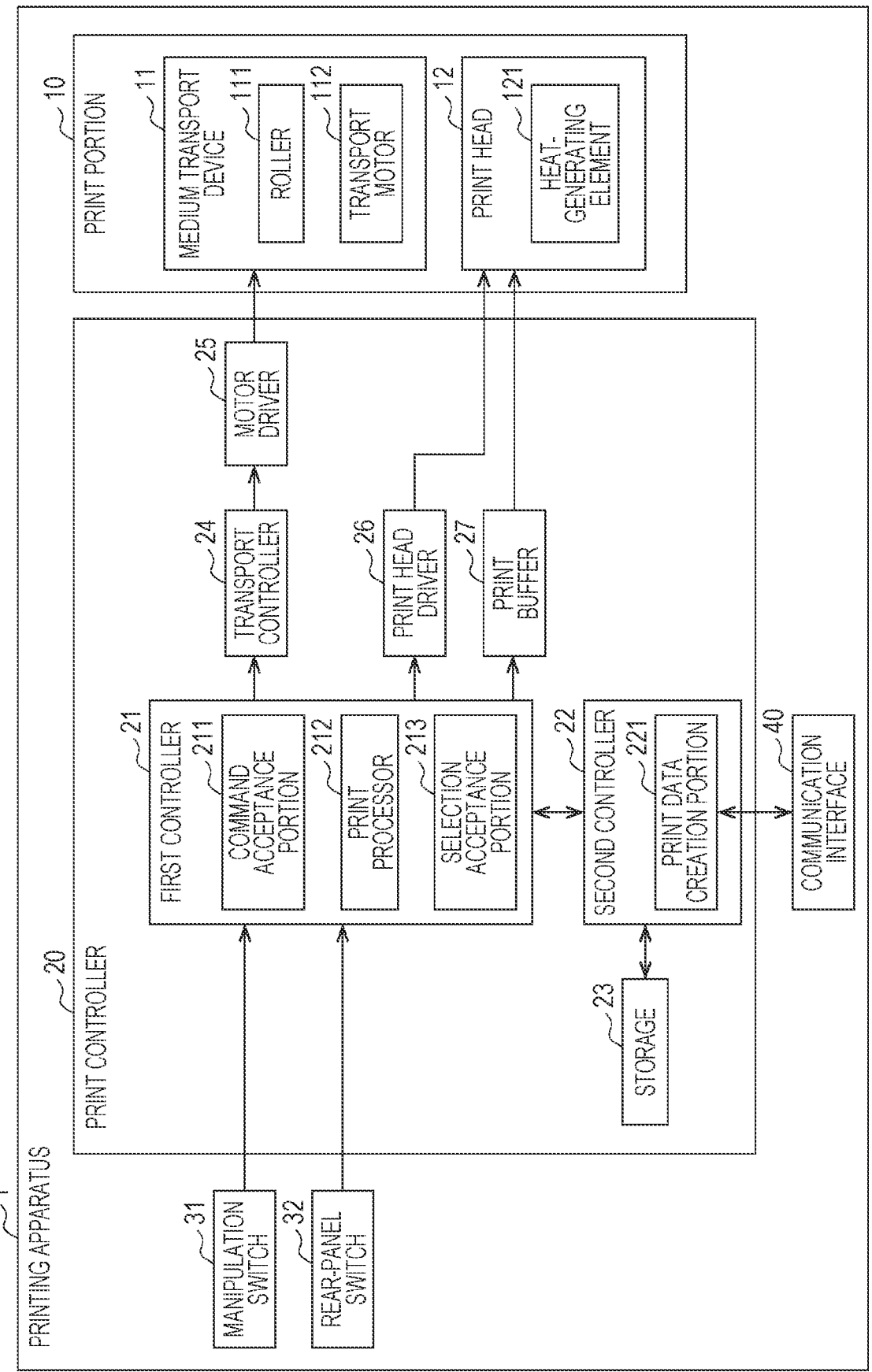
FIG. 1 illustrates the structure of a printing apparatus.

FIG. 1 is a block diagram illustrating an example of the structure of a printing apparatus 1 according to an embodiment. The printing apparatus 1 prints information on a print medium (such as, for example, paper or a film) drawn from a rolled medium, which is wound in a rolled state and is mounted in the printing apparatus 1. The printing apparatus 1 in this embodiment is a small-sized printer such as a receipt printer. In this embodiment, the printing apparatus 1 prints status information in response to a command (an instruction) to print status information. Status information about the printing apparatus 1 is information indicating the status of the printing apparatus 1. An example of the rolled medium is rolled paper. Examples of the print medium include recording paper and heat sensitive paper.

In this embodiment, status information includes intelligent function information, which is information related to intelligent functions. Intelligent functions are used for coupling to and cooperation with external terminals, peripheral devices, and the like. An intelligent function is, for example, a web server function. Intelligent function information is, for example, information indicating availability or unavailability as a web server. Status information includes network diagnosis information. Network diagnosis information is diagnosis information about the status of communication between the printing apparatus 1 and a given external apparatus (such as, for example, a host computer that asks the printing apparatus 1 to print information). For example, network diagnosis information indicates whether coupling to the given external apparatus is possible, a cause of the inability of coupling when coupling to the given external apparatus is not possible, and other information. Examples of network diagnosis information include information indicating the presence or absence of a given service set identifier (SSID) and confirmation information about a security method. Status information also includes simple access point (AP) function information. A Simple AP function uses the printing apparatus 1 as an access point and enables an external terminal to wirelessly couple directly to the printing apparatus 1 without passing through a router. Simple AP function information is, for example, the Internet protocol (IP) address of the printing apparatus 1 or a two-dimensional code used for coupling to the printing apparatus 1. Status information also includes settings referenced in various processing in the printing apparatus 1 as well as values indicating states of hardware in the printing apparatus 1. The settings are, for example, parameters referenced in network coupling processing and other parameters such as a print speed and print density referenced in print processing. The values are, for example, the remaining amount of consumables and a time elapsed from when the use of the printing apparatus 1 or the like started.

The printing apparatus 1 has a print portion 10, a print controller 20 that controls the print portion 10 to control printing, a manipulation switch 31 and a rear-panel switch 32, which are used to enter information, and a communication interface 40 used in communication with an external apparatus.

The print portion 10 has a medium transport device 11 that draws a print medium from a rolled medium as well as a print head 12 that performs printing on the print medium drawn from the rolled medium. The medium transport device 11 has a roller 111 that transmits a transport force by being brought into contact with the print medium as well as a transport motor 112 that drives the roller 111 through a transmission mechanism. The print head 12 has heat-generating elements 121 (print elements) that heat the print medium for coloring on the print medium. The print head 12 is, for example, a line thermal head in which a plurality of heat-generating elements 121 are linearly arranged in one dot line. The print head 12 forms a printed image by applying a voltage to each heat-generating element 121 to generate heat so that a portion in contact with the heat-generating element 121 is heated and is thereby colored. The print portion 10 may have a cutter. An example of the cutter has a first blade, which is a movable blade, and a second blade, which is a fixed blade. The first blade moves toward the second blade and cuts the print medium. When the print portion 10 has a cutter, the print portion 10 can cut a print medium on which printing has been performed to a desired length from the continuous print medium.

The print controller 20 controls the operations of the print head 12, medium transport device 11, and other components constituting the printing apparatus 1 as well as the operations of other devices, in a centralized manner. The print controller 20 has a first controller 21, a second controller 22, a storage 23, a transport controller 24, a motor driver 25, a print head driver 26, and a print buffer 27. In this embodiment, therefore, the print controller 20 is a two-core controller having two controllers, first controller 21 and second controller 22.

The first controller 21 has a central processing unit (CPU) and the like to control printing in which the print portion 10 is used. The first controller 21 controls the driving of the medium transport device 11 through the transport controller 24 and motor driver 25 and transports the print medium drawn from the rolled medium. The first controller 21 also controls the driving of the print head 12 through the print head driver 26 and form print dots on the print medium transported by the medium transport device 11 to form a printed image on the print medium. The first controller 21 is coupled to the manipulation switch 31 and rear-panel switch 32 and detects the manipulations on the manipulation switch 31 and rear-panel switch 32. The manipulation switch 31 functions as an input acceptance portion that accepts an input to the printing apparatus 1. In this embodiment, the manipulation switch 31 is a feed button used to command (to instruct) the transport of the print medium. Since, in this embodiment, the manipulation switch 31 is a button, an input manipulation on the manipulation switch 31 is performed by pressing the manipulation switch 31. The manipulation switch 31 is attached to any one of the front surface, upper surface, and side surfaces of the six planes of the printing apparatus 1. The rear-panel switch 32 is used to command the printing of status information. The rear-panel switch 32 is attached to the rear surface of the six planes of the printing apparatus 1. In this embodiment, the first controller 21 is not coupled directly to the communication interface 40.

The second controller 22 also has a CPU or the like. The second controller 22 creates print data for status information in response to a command from the first controller 21. In this embodiment, the second controller 22 controls communication with an external apparatus through a network to implement intelligent functions. In this embodiment, the second controller 22 is coupled to the communication interface 40. Therefore, the second controller 22 communicates with the external apparatus through the communication interface 40 with the network intervening between the external apparatus and the communication interface 40. The first controller 21 and second controller 22 are coupled to each other so that communication is possible between them.

The storage 23 is a storage device that stores various types of status information and the like.

The transport controller 24 controls the operation of the medium transport device 11 through the motor driver 25, in response to a command from the first controller 21. The motor driver 25 drives the transport motor 112 so that the print medium is transported, in response to a command from the transport controller 24.

The print head driver 26 applies a voltage to each heat-generating element 121 in the print head 12 and drives the print head 12, in response to a command from the first controller 21.

The print buffer 27 is a storage device such as random-access memory (RAM) that stores print data to be printed by the print head 12.

Next, functions implemented by the first controller 21 and second controller 22 and print processing implemented by these functions to print status information will be described in detail.

In this embodiment, the CPU in the first controller 21 implements the functions of a command acceptance portion 211, a print processor 212, and a selection acceptance portion 213 by loading programs stored in a coupled read-only memory (ROM) into a coupled RAM and then executing these programs. The ROM and RAM used by the CPU in the first controller 21 may be included in the first controller 21 or may be disposed outside the first controller 21. The CPU in the second controller 22 implements the function of a print data creation portion 221 by loading a program stored in a coupled ROM into a coupled RAM and then executing the program. The ROM and RAM used by the CPU in the second controller 22 may be included in the second controller 22 or may be disposed outside the second controller 22.

The command acceptance portion 211 is a function that accepts a command to print status information when the command acceptance portion 211 detects a manipulation performed on the rear-panel switch 32 in a given form.

The first controller 21 causes the function of the command acceptance portion 211 to detect a manipulation performed on the rear-panel switch 32 in a given form as the manipulation that commands the printing of status information. In the description below, this manipulation in a given form will be referred to as the print commanding manipulation. In this embodiment, the print commanding manipulation is to press the rear-panel switch 32 in a form in which the pressing of the rear-panel switch 32 continues for a given duration (3 seconds, 5 seconds, or the like, for example) or more. However, the print commanding manipulation may be a manipulation in another form. For example, the print commanding manipulation may be to press the rear-panel switch 32 a plurality of times in succession. Alternatively, the print commanding manipulation may be to press the rear-panel switch 32 a given number of times in succession at intervals of less than a given length of time (1 second, 0.8 second, or the like, for example). In this case, one press may be a press continuing for a duration less than a given duration (1 second, 0.8 second, or the like, for example).

The print processor 212 is a function that comprehensively controls the print portion 10 so that status information is printed when a command to print status information is accepted by the function of the command acceptance portion 211. The print data creation portion 221 is a function that creates print data for the status information and transmits the created print data to the requesting source in response to a request to transmit print data for the status information.

When a command to print status information is accepted, the first controller 21 causes the function of the print processor 212 to transmit, to the second controller 22, a request to transmit print data for given status information. In this embodiment, this given status information is network status information. The given status information is an example of first status information. The given status information is an example of first status information. The network status information indicates settings used when a given apparatus is to be coupled through the communication interface 40. Specifically, the network status information includes a coupling mode (wired coupling or wireless coupling) in which the printing apparatus 1 is coupled to the network, the IP address of the printing apparatus 1, a subnet mask, a default gateway of the printing apparatus 1 in the network to which the printing apparatus 1 is coupled, and the like.

The second controller 22 causes the function of the print data creation portion 221 to create print data for given status information in response to a request to transmit print data for the given status information, the request being issued from the first controller 21. In this embodiment, information about the network status of the printing apparatus 1 is stored in the storage 23. Therefore, the second controller 22 acquires, from the storage 23, the information about the network status of the printing apparatus 1, converts the acquired information to print data used in printing by the print head 12, and transmits the converted data to the first controller 21.

As another example, however, the first controller 21 may create print data instead of the second controller 22. In this case, the second controller 22 may transmit information yet to be converted to print data to the first controller 21, after which the first controller 21 may convert the transmitted information to print data. Alternatively, the second controller 22 may execute part of a process to create print data for status information and may transmit processed data in the middle of creation to the first controller 21. In this case, the first controller 21 may execute the rest of the process to create print data so that complete print data is created. Alternatively, the first controller 21 may create print data for part of status information without the intervention of the second controller 22.

Figure 2:
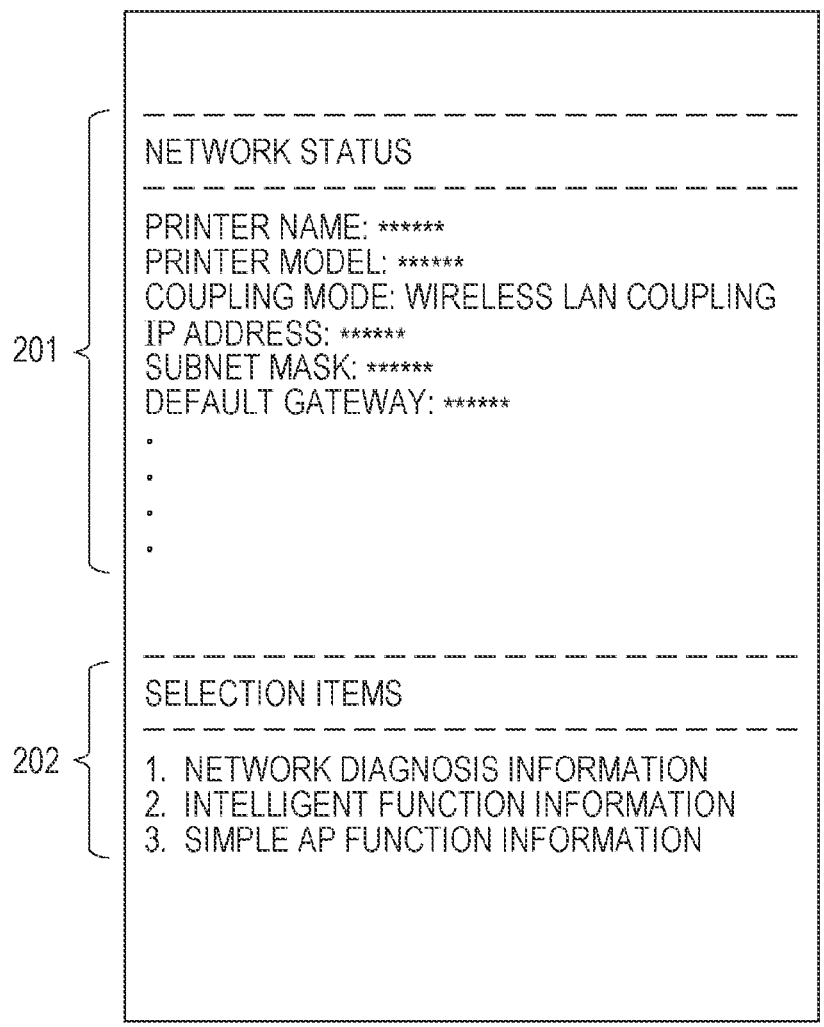
FIG. 2 illustrates a print medium on which status information is printed.

The first controller 21 acquires the print data, transmitted from the second controller 22, for the given status information and stores the print data in the print buffer 27. The first controller 21 causes the print head 12 to print the given status information stored in the print buffer 27 on a print medium through the print head driver 26 while the first controller 21 transports the print medium to the medium transport device 11 through the transport controller 24 and motor driver 25. In correspondence with other pieces of printable status information, the first controller 21 also causes the print head 12 to print, on the print medium, one or more selection items used to select status information to be printed. Each selection item to be printed corresponds to one of pieces of status information, each of which is a candidate to be printed. In this embodiment, the first controller 21 makes a demand on the second controller 22 for print data for selection items. The second controller 22 creates print data for the selection items in response to the demand and transmits the print data to the first controller 21. However, the first controller 21 may create print data for selection items instead of the second controller 22. FIG. 2 illustrates a print medium on which given status information and selection items are printed. As illustrated in FIG. 2, network status information is printed in an area 201 and selection items are printed in an area 202. In this embodiment, the first controller 21 assigns numbers to three selection items corresponding to three pieces of status information, network diagnosis information, intelligent function information and Simple AP function information, before printing the selection items. Specifically, in this embodiment, the first controller 21 numbers the three selection items so that the number 1 is assigned to the selection item corresponding to network diagnosis information, the number 2 is assigned to the selection item corresponding to intelligent function information, and the number 3 is assigned to the selection item corresponding to Simple AP function information, as illustrated in FIG. 2.

The user can confirm the selection items printed in this way and can thereby comprehend printable status information. Therefore, the user can determine status information that the user wants to print and status information that does not need to be printed. The user then notifies the printing apparatus 1 of status information to be printed by manipulating the manipulation switch 31. In this embodiment, the user commands the printing apparatus 1 to print the relevant status information by repeatedly pressing the manipulation switch 31 as many times as the value of the number assigned to the selection item for less than a given first duration (1 second, 0.8 second, or the like, for example) at intervals of less than a given length of time (1 second, 0.8 second, or the like, for example). For example, the user commands the printing apparatus 1 to print intelligent function information on a print medium by repeatedly pressing the manipulation switch 31 two times for less than the first duration at intervals of less than the given length of time.

The selection acceptance portion 213 is a function that accepts at least one selection of the selection items printed by the function of the print processor 212, in response to the manipulation performed on the manipulation switch 31.

The first controller 21 causes the function of the selection acceptance portion 213 to detect a manipulation on the manipulation switch 31 in a given form as a manipulation to select a selection item. In the description below, this manipulation in a given form will be referred to as the selection manipulation. In this embodiment, the first controller 21 detects, as the selection manipulation, a manipulation on the manipulation switch 31 in which a press continuing for a duration less than the first duration is performed once or is repeated in succession at intervals of less than the given length of time. The first controller 21 identifies the number of times the manipulation switch 31 was pressed in succession in the detected selection manipulation. The first controller 21 then identifies the selection item assigned the same number as the value of the identified number of times from the selection items printed on the print medium. The first controller 21 determines the status information corresponding to the identified selection item as the status information selected as the target to be printed. In the description below, the status information selected as the target to be printed will be referred to as the selected status information. The selected status information is an example of second status information.

The first controller 21 also causes the function of the selection acceptance portion 213 to detect a manipulation on the manipulation switch 31 in a given form as a manipulation to command the printing of selected status information. In the description below, this manipulation in a given form will be referred to as the selected status printing manipulation. In this embodiment, the first controller 21 detects, as the selected status printing manipulation, a manipulation on the manipulation switch 31 in which a press continues for a duration more than or equal to the first duration.

Thus, the printing apparatus 1 separately accepts a selection of selection items and a command to print selected status information. This enables the user to easily comprehend which of a selection of selection items and the commanding of selected status information printing is being performed in the printing apparatus 1.

When a command to print selected status information is accepted by the function of the selection acceptance portion 213, the first controller 21 causes the function of the print processor 212 to print the selected status information. Specifically, the first controller 21 transmits a request to transmit print data for the selected status information to the second controller 22.

The second controller 22 causes the function of the print data creation portion 221 to create print data for the selected status information in response to the request, from the first controller 21, to transmit print data for the selected status information. In this embodiment, when the selected status information is network diagnosis information, the second controller 22 makes a diagnosis as to coupling to a given coupling destination through the communication interface 40 and acquires a diagnosis result. In the diagnosis of coupling to the given coupling destination, whether coupling to the given coupling destination is possible is diagnosed and when coupling to the given coupling destination is not possible, the cause is diagnosed (the cause is, for example, that the given coupling destination is not coupled to a network or is not found on the coupled network). The second controller 22 converts the acquired diagnosis result to print data used in printing by the print head 12 to create print data for network diagnosis information.

When the selected status information is intelligent function information, the second controller 22 makes a diagnosis as to whether intelligent functions of the printing apparatus 1 can be used, and when they cannot be used, what is the cause (examples of the cause are that the printing apparatus 1 is not coupled to a network and that a load in other processing is too large) and acquires a diagnosis result. The second controller 22 converts the acquired diagnosis result to print data used in printing by the print head 12 to create print data for intelligent function information.

When the selected status information is Simple AP function information, the second controller 22 prepares for acceptance of wireless coupling between the printing apparatus 1 and an external terminal without intervention by a router. For example, the second controller 22 releases a port used in coupling and identifies the IP address of the printing apparatus 1, the IP address being the coupling destination of the external terminal. The second controller 22 acquires information used for the coupling of the external terminal to the printing apparatus 1 (such as, for example, the IP address of the printing apparatus 1 and a two-dimensional code used in coupling to the printing apparatus 1). The second controller 22 converts the acquired information to print data used in printing by the print head 12 to create print data for Simple AP function information.

The second controller 22 transmits the created print data for the created selected status information to the first controller 21.

Figure 3:
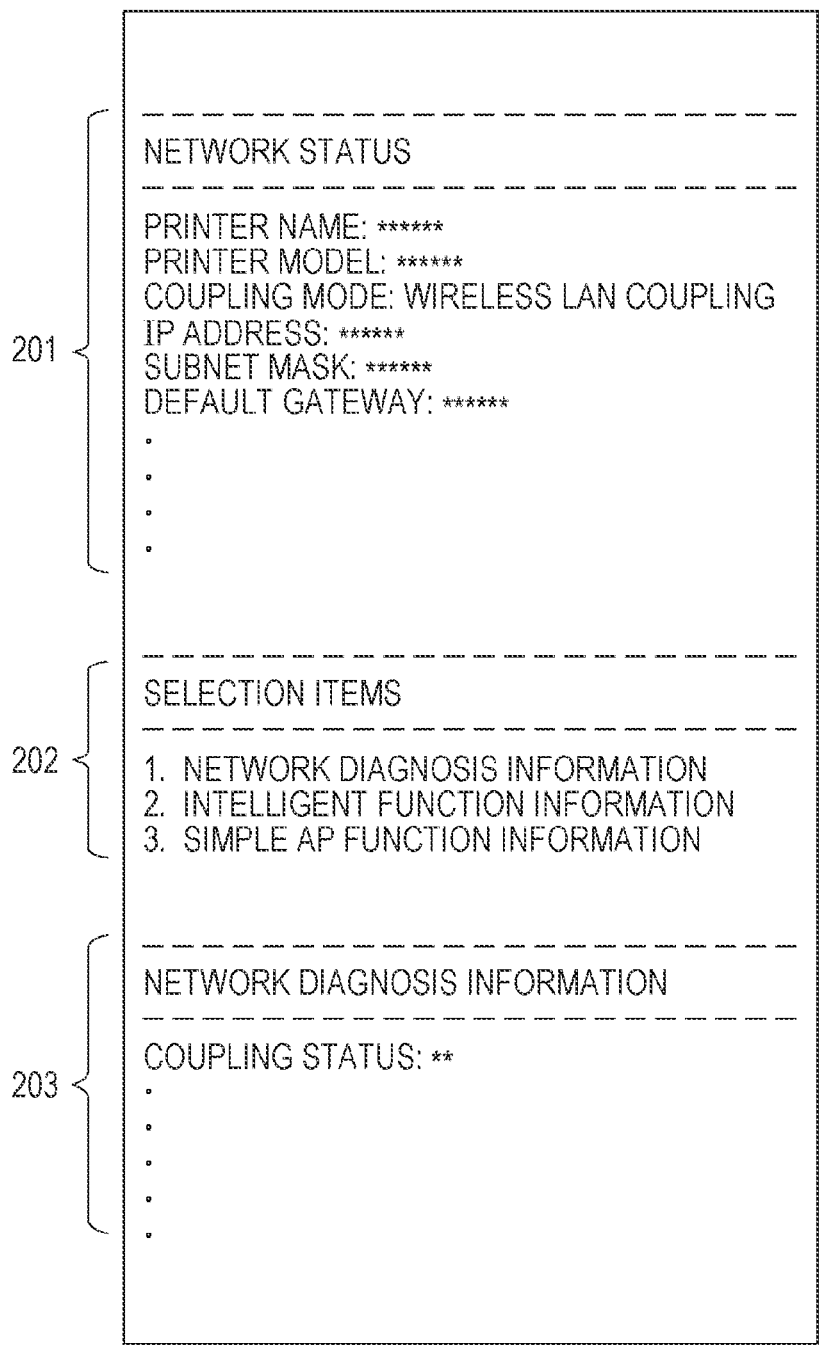
FIG. 3 illustrates another print medium on which status information is printed.

The first controller 21 causes the function of the print processor 212 to acquire the print data, transmitted from the second controller 22, for the selected status information and stores the acquired print data in the print buffer 27. The first controller 21 causes the print head 12 to print the given status information stored in the print buffer 27 on a print medium through the print head driver 26 while the first controller 21 transports the print medium to the medium transport device 11 through the transport controller 24 and motor driver 25. FIG. 3 illustrates a print medium on which selected status information is printed by the function of the print processor 212 when network diagnosis information is selected as the selected status information. In FIG. 3, network diagnosis information is printed in an area 203 following the area 202, in which selection items are printed, on the print medium.

Due to the structure in this embodiment described above, the printing apparatus 1 causes the print portion 10 to print network status information, which is given status information, and also causes the print portion 10 to print selection items corresponding to pieces of status information, each of which is a candidate to be printed. When the printing apparatus 1 detects at least one selection of the printed selection items, the printing apparatus 1 causes the print portion 10 to print the status information corresponding to the selected selection item. Thus, the printing apparatus 1 does not print undesired status information and can thereby reduce a wait time expended by the user until the printing of the status information is completed. In addition, the printing apparatus 1 can reduce the amount of print medium that would otherwise be wasted as a result of printing undesired status information.

In this embodiment, the printing apparatus 1 prints network status information as given status information without requesting a selection as to whether to print the network status information. The possibility that the user wants to view network status information is high when compared with other status information. Therefore, the printing apparatus 1 can reduce extra work involved in the unnecessary selection by the user by printing the network status information without requesting a selection as to whether to print the network status information.

In this embodiment, the printing apparatus 1 accepts a selection of status information to be printed in response to a manipulation on the manipulation switch 31. Therefore, the user can select status information to be printed by manipulating the manipulation switch 31, which is easier to manipulate than the rear-panel switch 32 disposed on the rear surface, which is harder to confirm and touch than the other surfaces of the printing apparatus 1. Thus, the printing apparatus 1 can be made more convenient.

In this embodiment, the first controller 21 makes a demand on the second controller 22 for print data for status information. When the amount of status information to be printed is increased, therefore, the amount of data transmitted and received between the first controller 21 and the second controller 22 is increased. This may increase a time taken for communication between the first controller 21 and the second controller 22. In the structure including the first controller 21 and second controller 22, the printing apparatus 1 can reduce the amount of data transmitted and received between the first controller 21 and the second controller 22 by not printing undesired status information, which has not been selected, and can thereby reduce a much more wait time expended by the user.

In this embodiment, preprocessing such as diagnosis and preparation is performed before print data for network diagnosis information, intelligent function information, and Simple AP function information is created. Since the printing apparatus 1 does not print undesired status information, the printing apparatus 1 can keep the user from having to wait until preprocessing for the undesired status information is completed.

2. Status Information Print Processing

Figure 4:
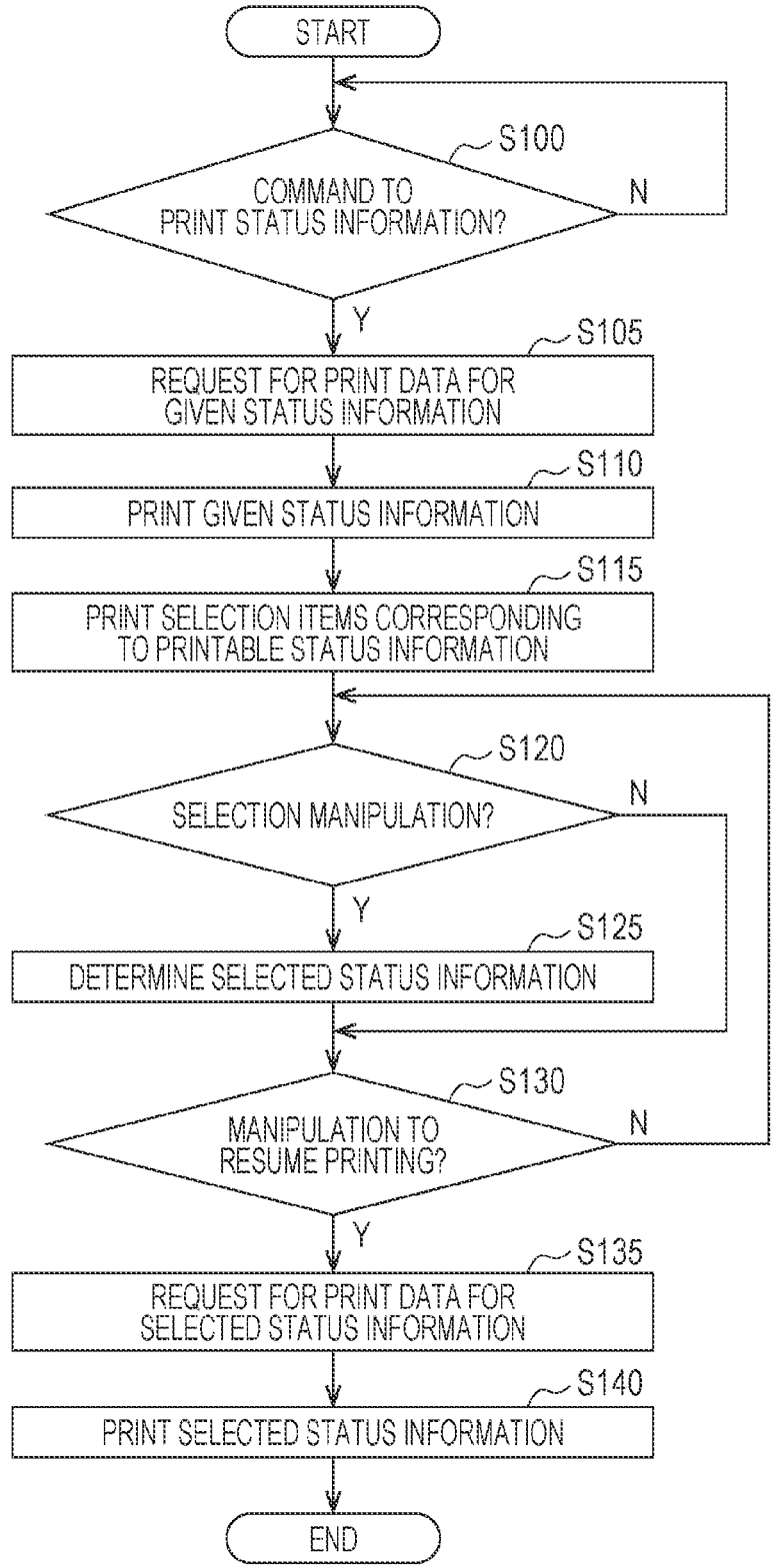
FIG. 4 is a flowchart indicating print processing to print status information.

Status information print processing executed by the printing apparatus 1 will be described with reference to FIG. 4. The printing apparatus 1 starts processing in FIG. 4 when power is turned on as a trigger. However, the printing apparatus 1 may start processing in FIG. 4 in response to another trigger (when, for example, a given time of the day arrives).

In S100, the first controller 21 causes the function of the command acceptance portion 211 to decide whether a manipulation performed on the rear-panel switch 32 to command printing has been detected. When the function of the command acceptance portion 211 decides that a manipulation performed on the rear-panel switch 32 to command printing has been detected, the first controller 21 causes the process to proceed to S105. When the function of the command acceptance portion 211 decides that a manipulation performed on the rear-panel switch 32 to command printing has not been detected, the first controller 21 repeats processing in S100.

In S105, the first controller 21 causes the function of the print processor 212 to transmit a request to transmit print data for network status information, which is the given status information, to the second controller 22. The second controller 22 causes the function of the print data creation portion 221 to create print data for the given status information in response to the request to transmit print data for the given status information, the request having been transmitted from the first controller 21, after which the second controller 22 transmits the created print data to the first controller 21.

In S110, the first controller 21 causes the function of the print processor 212 to acquire the print data for the given status information, the print data having been transmitted from the second controller 22, and to store the acquired print data in the print buffer 27. The first controller 21 causes the print head 12 to print the given status information stored in the print buffer 27 on a print medium through the print head driver 26 while the first controller 21 transports the print medium to the medium transport device 11 through the transport controller 24 and motor driver 25.

In S115, the first controller 21 causes the print head 12 to print selection items corresponding to other pieces of printable status information by using the function of the print processor 212. In this embodiment, the first controller 21 assigns the numbers 1, 2, and 3 to three selection items corresponding to three pieces of status information, network diagnosis information, intelligent function information and Simple AP function information, in that order and then prints the numbered selection items.

In S120, the first controller 21 causes the function of the selection acceptance portion 213 to decide whether a selection manipulation has been performed on the manipulation switch 31. When the function of the selection acceptance portion 213 decides that a selection manipulation has been performed on the manipulation switch 31, the first controller 21 causes the process to proceed to S125. When the function of the selection acceptance portion 213 decides that a selection manipulation has not been performed on the manipulation switch 31, the first controller 21 causes the process to proceed to S130.

In S125, the first controller 21 causes the function of the selection acceptance portion 213 to identify the number of times the manipulation switch 31 was pressed in succession in the selection manipulation for which the decision that it has been performed is made in the immediately preceding step S120. The first controller 21 identifies the selection item assigned the same number as the value of the identified number of times from the selection items printed on the print medium. The first controller 21 then determines the status information corresponding to the identified selection item as the selected status information.

In S130, the first controller 21 causes the function of the selection acceptance portion 213 to decide whether a selected status printing manipulation has been performed on the manipulation switch 31. When the function of the selection acceptance portion 213 decides that a selected status printing manipulation has been performed on the manipulation switch 31, the first controller 21 causes the process to proceed to S135. When the function of the selection acceptance portion 213 decides that a selected status printing manipulation has not been performed on the manipulation switch 31, the first controller 21 causes the process to return to S120.

In S135, the first controller 21 causes the function of the print processor 212 to transmit, to the second controller 22, a request to transmit print data for the selected status information. The second controller 22 causes the function of the print data creation portion 221 to create print data for the selected status information and to transmit the created print data to the first controller 21, in response to the request, from the first controller 21, to transmit print data for the selected status information.

In S140, the first controller 21 causes the function of the print processor 212 to acquire the print data for the selected status information, the print data having been transmitted from the second controller 22, and to store the acquired print data in the print buffer 27. The first controller 21 controls the print head 12 through the print head driver 26 so that the selected status information stored in the print buffer 27 is printed on a print medium while the first controller 21 transports the print medium to the medium transport device 11 through the transport controller 24 and motor driver 25.

3. Other Embodiments

The embodiment described above is merely an example used to practice the present disclosure. Various other embodiments can also be used. A technique in which given status information and selection items corresponding to other pieces of printable status information are printed in response to a command to print status information, at least one selection of the printed selection items is accepted, and the selected status information is printed as in the above embodiment can also be implemented as a program or a method.

In the embodiment described above, the print controller 20 has been a two-core controller having the first controller 21 and second controller 22. The first controller 21 and second controller 22 have printed status information in cooperation with each other. However, the print controller 20 may be structured as a one-core controller having a single controller. In this case, the single controller in the print controller 20 is structured so as to have functions of both the first controller 21 and the second controller 22, for example. Alternatively, the print controller 20 may be structured as three or more cores having three or more controllers.

In the above embodiment, the printing apparatus 1 has printed given status information on a print medium and then has printed selection items corresponding to other pieces of printable status information on the print medium. However, an order in which given status information and selection items are printed is not limited to the above order. For example, the sequence of S110 and S115 may be reversed in processing in FIG. 4. That is, the printing apparatus 1 may print selection items on a print medium and may then print given status information.

In the above embodiment, the second controller 22 has performed preprocessing for print data for network diagnosis information, intelligent function information, and Simple AP function information. However, the second controller 22 may perform preprocessing for print data for network diagnosis information, intelligent function information, and Simple AP function information.

In the above embodiment, given status information has been network status information. However, given status information may be information other than network status information or may be a combination of a plurality of pieces of status information. For example, given status information may be status information about a rolled medium mounted in the printing apparatus 1 (such as the type of the medium, the remaining amount of paper, and the like).

Given status information preferably includes a fewer number of print items, which are items to be printed, than other printable status information. During the printing of status information, given status information is printed regardless of what the user selects. Therefore, when status information including a fewer number of print items than other printable status information is used as given status information, the printing apparatus 1 can suppress an increase in time taken in printing.

In the above embodiment, printable status information other than given status information is network diagnosis information, intelligent function information, and Simple AP function information. However, printable status information other than given status information may exclude at least part of these pieces of status information or may include different information (status information about the rolled medium, for example) from these pieces of status information.

In the above embodiment, the printing apparatus 1 has started the printing of status information by using a print commanding manipulation on the rear-panel switch 32 as a trigger. However, the printing apparatus 1 may start the printing of status information in response to a trigger other than a print commanding manipulation on the rear-panel switch 32. For example, when the manipulation switch 31 is pressed for a duration of a given threshold (3 seconds, 5 seconds, or the like, for example) or more as a trigger in a state in which the cover of a storage portion of a rolled medium in the printing apparatus 1 is closed, the printing apparatus 1 may start the printing of status information.

In the above embodiment, the manipulation switch 31 has been a feed button. However, the manipulation switch 31 may be other than a feed button. For example, the manipulation switch 31 may be a button provided to select selection items.

Figure 5:
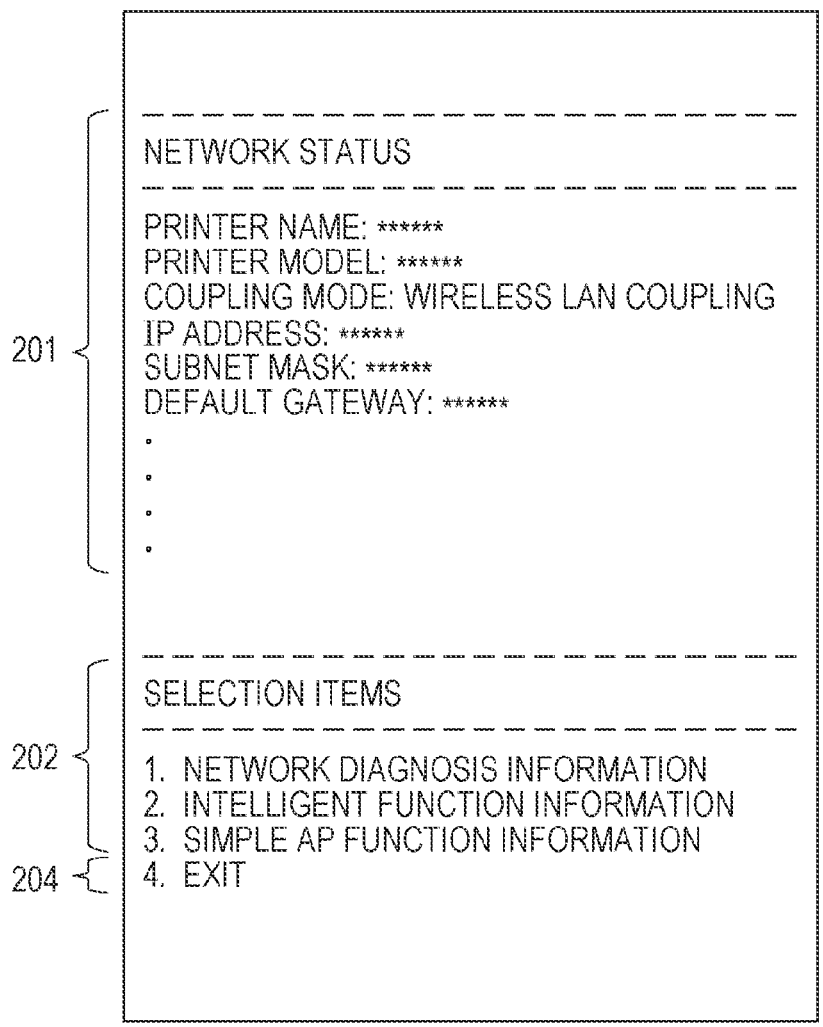
FIG. 5 illustrates another print medium on which status information is printed.

In the above embodiment, the printing apparatus 1 has printed selection items corresponding to pieces of printable status information on a print medium and has accepted at least one selection of the printed selection items through the manipulation switch 31. However, the printing apparatus 1 may print a termination selection item, which is used to select the termination of status information printing, on a print medium together with selection items. For example, the printing apparatus 1 may print an EXIT item assigned the number 4 in the area 203, which is immediately below the area 202 in which the selection items numbered 1 to 3 are printed, as illustrated in FIG. 5. In this case, when, for example, the printing apparatus 1 detects a manipulation in which a press as in a selection manipulation on the manipulation switch 31 is performed four times in succession, the printing apparatus 1 terminates the status information printing. Thus, when status information desired by the user is not found in the status information corresponding to the printed selection items, the printing apparatus 1 terminates printing by the printing apparatus 1, so the rolled medium can be more greatly saved.

The printing apparatus 1 may terminate the printing of status information when a manipulation on the manipulation switch 31 is not detected before a given duration (1 minute, 2 minutes, or 3 minutes, for example) elapses after given status information and selection items are printed. Alternatively, the printing apparatus 1 may terminate the printing of status information when a selected status printing manipulation is performed on the manipulation switch 31 with selected status information not selected after given status information and selection items are printed.

In the above embodiment, after the printing of given status information and selection items, the printing apparatus 1 has accepted a selection of selection items until a selected status printing manipulation is performed on the manipulation switch 31. However, the user may want to confirm only one of the plurality of pieces of status information corresponding to the selection items, for example. In this case, since the selection manipulation is performed only once, the user needs to perform a selected status printing manipulation again after the selection manipulation. This may become extra work that hinders the user. To prevent this, when a selection manipulation is performed once on the manipulation switch 31 after the printing of given status information and selection items, the printing apparatus 1 may start the printing of the selected status information determined according to the selection manipulation. Thus, the printing apparatus 1 can reduce extra work involved in the unnecessary manipulation.

In the above embodiment, after the printing of given status information and selection items, the printing apparatus 1 has accepted a selection of selection items. After accepting the selection items, the printing apparatus 1 may detect a manipulation performed on the manipulation switch 31 in a given form to command the resetting of the selection of the selection items until a selected status printing manipulation is performed on the manipulation switch 31. When, for example, the printing apparatus 1 detects a manipulation in which a press as in a selection manipulation on the manipulation switch 31 is performed a given number of times (10 times or the like, for example) or more in succession, the printing apparatus 1 may make the determination that the determined selected status information is not used as selected status information. Thus, even when the user fails in a selection of selection items, the user can still select desired selection items.

In the above embodiment, the selection manipulation has been a manipulation on the manipulation switch 31 in which a press continuing for a duration less than the first duration is performed once or is repeated in succession at intervals of less than a given length of time. However, the selection manipulation may be another manipulation on the manipulation switch 31. For example, the selection manipulation may be a press continuing for a duration less than or equal to the sum of a duration with a length corresponding to the number assigned to the selection item to be selected and given error (0.1 second or the like, for example). The duration with a length corresponding to the number assigned to the selection item to be selected is, for example, 1 second for the selection item numbered 1, 2 seconds for the selection item numbered 2, and 3 seconds for the selection item numbered 3.

In the above embodiment, the selected status printing manipulation has been a press on the manipulation switch 31, the press continuing for a duration more than or equal to the first duration. However, the selected status printing manipulation may be another manipulation. For example, the selected status printing manipulation may be a manipulation on the manipulation switch 31 in which a press continuing for a duration less than the first duration is performed in succession at least as many times as the number of printed selection items at intervals of less than a given length of time.

The selection item only needs to be an item that indicates what is the corresponding status information. For example, the selection item suffices when it is the name of the corresponding status information.

The present disclosure can also be applied as a method or a program executed by a computer. Programs and methods of this type include those in various aspects. They may be implemented in a single apparatus or by using parts included in a plurality of apparatuses. These programs and methods can be appropriately modified so that, for example, one part of them is software and another part is hardware. Furthermore, the present disclosure also holds as a recording medium for programs. The recording medium for programs may be a magnetic recording medium, a semiconductor memory, or the like. This can be thought to be completely true for any recording medium developed in the future.

What is claimed is:

1. A printing apparatus comprising:
a print head configured to perform printing on a print medium drawn from a rolled medium, and
wherein
the printing apparatus is configured to
print, by the print head, status information in response to an instruction to print the status information,
print, by the print head, at least one of selection items corresponding to pieces of information,
print, when at least one printed selection item is selected, information corresponding to the selected selection item, and
wherein the at least one printed selection item is selected in response to the number of at least one input which the printing apparatus accepts from a user, the at least one input continuing for a duration less than a first duration, and
the information corresponding to the selected selection item is printed in response to an input which the printing apparatus accepts from the user, the input continuing for the first duration or more.

2. The printing apparatus according to claim 1, wherein
at least one selection item and a termination selection item used to terminate status information printing are printed by the print head, and
when the termination selection item is selected, the status information printing is terminated.

3. The printing apparatus according to claim 1, further comprising:
a first controller that controls the print head and a second controller that communicates with the first controller, wherein
when the selection item is selected, the first controller transmits, to the second controller, a request to transmit the information corresponding to the selected selection item and
the information corresponding to the selected selection item is printed according to information transmitted from the second controller.

4. The printing apparatus according to claim 1, wherein the status information includes a fewer number of print items than the information corresponding to the selected selection item.

5. The printing apparatus according to claim 1, wherein the at least one of selection items is a selection item corresponding to network diagnosis information, a selection item corresponding to intelligent function information, or a selection item corresponding to Simple AP function information.

6. A control method for a printing apparatus configured to include a print head configured to perform printing on a print medium drawn from a rolled medium, the control method comprising:
printing status information in response to an instruction to print the status information;
printing at least one of selection items corresponding to pieces of information;
printing, when at least one printed selection item is selected, information corresponding to the selected selection item, and
wherein the at least one printed selection item is selected in response to the number of at least one input which the printing apparatus accepts from a user, the at least one input continuing for a duration less than a first duration, and
the information corresponding to the selected selection item is printed in response to an input which the printing apparatus accepts from the user, the input continuing for the first duration or more.

7. The control method according to claim 6, further comprising printing at least one selection item and a termination selection item used to terminate status information printing, and
terminating, when the termination selection item is selected, the status information printing.

8. The control method according to claim 6, wherein the at least one of selection items is a selection item corresponding to network diagnosis information, a selection item corresponding to intelligent function information, or a selection item corresponding to Simple AP function information.

9. A control method for a printing apparatus configured to include a print head configured to perform printing on a print medium drawn from a rolled medium, the control method comprising:
printing status information in response to an instruction to print the status information;
printing selection items corresponding to pieces of information;

printing, when at least one printed selection item is selected, information corresponding to the selected selection item, and wherein a predetermined printed selection item of the printed selection items is selected in response to at least one input which the printing apparatus accepts from a user, the at least one input continuing for a duration less than a first duration, and a printed selection item different from the predetermined printed selection item is selected in response to at least one input which the printing apparatus accepts from the user, the at least one input continuing for the first duration or more.

* * * * *